US012572978B2

(12) United States Patent (10) Patent No.: US 12,572,978 B2

Rane et al. (45) Date of Patent: Mar. 10, 2026

(54) REAL-TIME CARD TIER UPGRADES FOR CARD NOT PRESENT TRANSACTIONS

(71) Applicant: MASTERCARD INTERNATIONAL INCORPORATED, Purchase, NY (US)

(72) Inventors: Rohan Ganpat Rane, Jagdusha Nagar (IN); Swagata Chakraborty, Bhilai (IN)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 9 days.

(21) Appl. No.: 18/444,611

(22) Filed: Feb. 16, 2024

(65) Prior Publication Data

US 2025/0265641 A1 Aug. 21, 2025

(51) Int. Cl.
*G06Q 40/02* (2023.01)
*G06Q 20/34* (2012.01)

(52) U.S. Cl.
CPC ............. *G06Q 40/02* (2013.01); *G06Q 20/34* (2013.01)

(58) Field of Classification Search
CPC ............................... G06Q 40/02; G06Q 20/34
USPC ...................................................... 705/1.1, 35
See application file for complete search history.

(56) References Cited

U.S. PATENT DOCUMENTS

| | | | | |
|---|---|---|---|---|
| 7,584,126 B1 * | 9/2009 | White | ..................... | G06Q 40/02 |
| | | | | 705/40 |
| 8,972,878 B2 * | 3/2015 | Mohler | ................... | H04L 63/08 |
| | | | | 715/708 |
| 9,801,053 B1 * | 10/2017 | Ziraknejad | .............. | H04L 63/06 |
| 10,817,935 B1 * | 10/2020 | Joglekar | ................ | G06Q 40/03 |
| 2003/0229585 A1 * | 12/2003 | Butler | .................... | G06Q 30/02 |
| | | | | 705/35 |
| 2008/0228646 A1 | 9/2008 | Meyers et al. | | |
| 2012/0265681 A1 * | 10/2012 | Ross | ..................... | G06Q 40/02 |
| | | | | 705/44 |
| 2015/0221028 A1 | 8/2015 | White et al. | | |
| 2016/0224964 A1 | 8/2016 | Vergari et al. | | |

(Continued)

FOREIGN PATENT DOCUMENTS

| | | | | |
|---|---|---|---|---|
| CA | 3036152 A1 * | 7/2020 | .......... | G06V 30/413 |
| WO | 2017196349 A1 | 11/2017 | | |

*Primary Examiner* — William E Rankins

(74) *Attorney, Agent, or Firm* — Barta Jones, PLLC

(57) ABSTRACT

Examples provide a system for real-time card tier upgrades for cardholders in card-not-present (CNP) transactions. A cardholder is notified that an account is eligible for upgrade to a higher tier. When a card-not-present transaction request is received, an upgrade manager requests consent from the cardholder in real-time during the account authentication process. If the cardholder consents to the upgrade, an upgrade code is mapped to the personal account number (PAN) associated with the account of the cardholder before the CNP transaction is authorized. The account is upgraded to the higher tier and the CNP transaction is completed using the account at the higher tier. If the consent is not received for the upgrade, the CNP transaction is completed using the account at the lower tier. This enables a merchant-agnostic and industry-agnostic real-time card tier upgrade without changing the PAN and without cardholder presentation of a physical account card.

20 Claims, 10 Drawing Sheets

(56)  References Cited

U.S. PATENT DOCUMENTS

| 2018/0079249 | A1 | 3/2018 | Mullen et al. |
| 2022/0222699 | A1 | 7/2022 | Bloy et al. |

* cited by examiner

100

200

300

400

600

START

REQUESTOR INITIATES TRANSACTION AUTHORIZATION
602

CNP TRANSACTION RECEIVED AT RECIPIENT NETWORK
604

NETWORK VALIDATES USING PAN-TO-CODE MAPPING
606

NETWORK ADDS NEW UPGRADE CODE AGAINST PAN AND SENDS TO ISSUER
608

AFTER ISSUER HAS APPROVED TRANSACTION, ACQUIRER RECEIVES A
RESPONSE ALONG WITH NEW UPGRADE CODE
610

END

700

START

ACQUIRER SUBMITS CLEARING RECORD
WITH NEW UPGRADE CODE
702

NETWORK CLEARS THE TRANSACTIONS
AFTER DATA VALIDATIONS
704

ISSUER RECEIVES REVISED INTERCHANGE
706

END

1000

REAL-TIME CARD TIER UPGRADES FOR CARD NOT PRESENT TRANSACTIONS

BACKGROUND

There are many different types of transaction-related accounts having a variety of tiers associated with those accounts. Different tiers are associated with different terms, limitations, rewards, and other benefits. More beneficial account terms and benefits are associated with each higher tier, which makes upgrading to the next higher tier desirable for users. However, from a technical perspective, upgrading to a higher tier frequently results in a change to an account number associated with the user's account. It is difficult to administer the account number change and associate that change across all the computer systems involved in transaction processing. For example, these account number changes can result in hardship and challenges when the account numbers are stored in different websites, such as for seamless checkout and/or auto-renewal of subscriptions, memberships, and other services. Moreover, the process for upgrading an account to a different tier typically requires the user to call a card issuer, apply for the upgrade, appear in person at a location associated with the card issuer, and/or present a physical account card in person. This can be a tedious and time-intensive process which can result in errors in the computing systems that manage the account numbers.

SUMMARY

Some examples provide a system and method for real-time card tier upgrade of an account during a card-not-present transaction. An upgrade manager notifies a cardholder that an account associated with a card is eligible for upgrade to a higher tier. The account has a primary account number (PAN). The PAN is associated with a first tier of card membership. Subsequent to notifying the cardholder, the upgrade manager associated with a recipient system receives a card-not-present (CNP) request using the account associated with the card. Upon receiving the CNP transaction request, the card manager requests a consent from the cardholder for the upgrade to the higher tier. The consent is requested within the recipient system before authorizing the CNP transaction. The consent of the cardholder is received before authorizing the CNP transaction. The account of the cardholder is upgraded to the higher tier by associating an upgrade code corresponding to a second tier with the PAN. The CNP transaction is authorized at the second tier using the upgrade code associated with the PAN, thus enabling a merchant-agnostic and industry-agnostic real-time card tier upgrade within the recipient system.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Corresponding reference characters indicate corresponding parts throughout the drawings.

DETAILED DESCRIPTION

Figure 1:
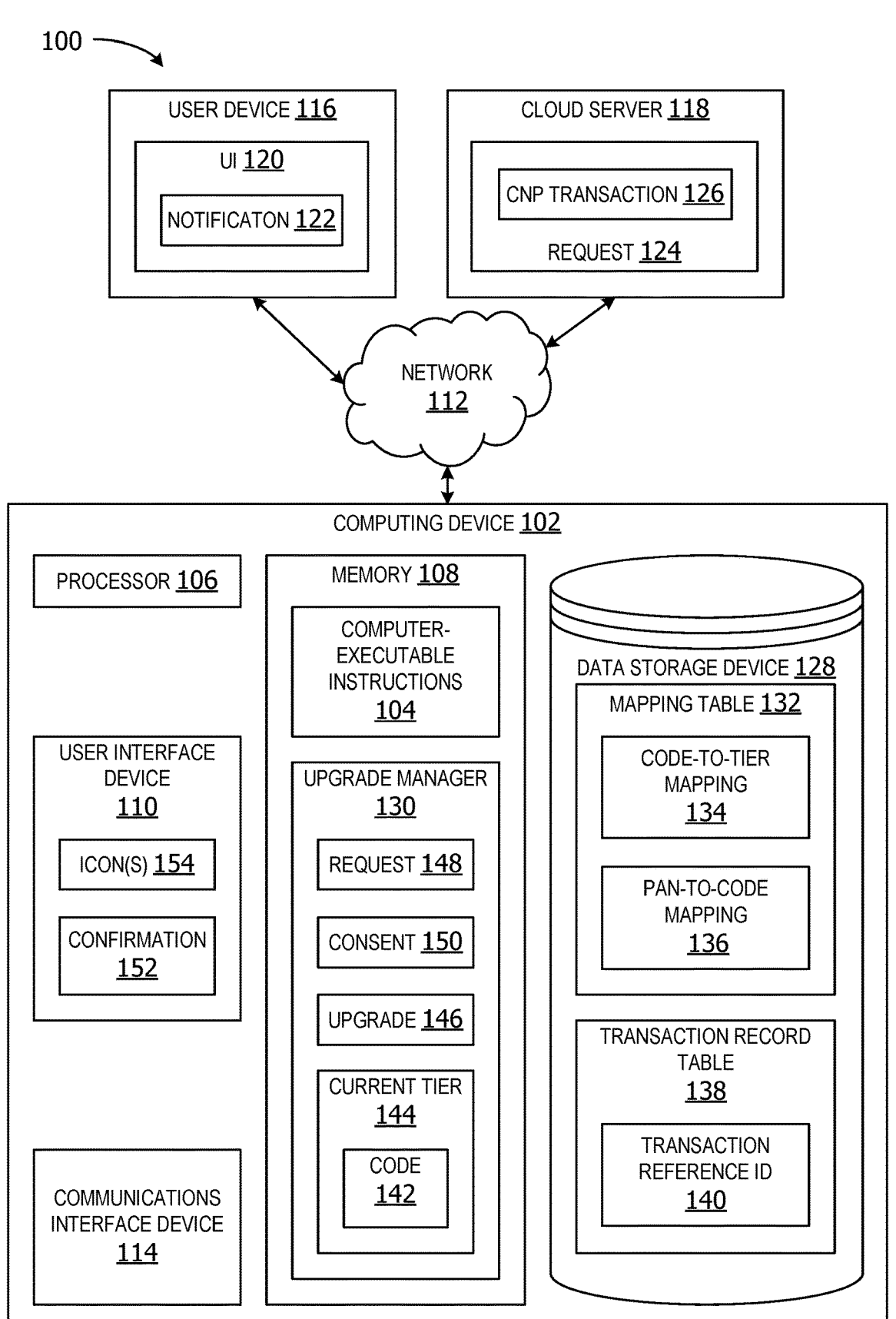
FIG. 1 is an exemplary block diagram illustrating a system for account tier upgrades during card-not-present (CNP) transactions in real-time.

A more detailed understanding can be obtained from the following description, presented by way of example, in conjunction with the accompanying drawings. The entities, connections, arrangements, and the like that are depicted in, and in connection with the various figures, are presented by way of example and not by way of limitation. As such, any and all statements or other indications as to what a particular figure depicts, what a particular element or entity in a particular figure is or has, and any and all similar statements, that can in isolation and out of context be read as absolute and therefore limiting, can only properly be read as being constructively preceded by a clause such as "In at least some examples, . . . " For brevity and clarity of presentation, this implied leading clause is not repeated ad nauseum.

The card tier upgrade process in existing systems is technologically inefficient. Card number changes present a technical challenge, especially when card numbers are saved in merchant websites for easy renewal of subscriptions, quick checkout and/or seamless access to content. In contrast, aspects of the disclosure provide a system that enables eligible cardholders to be upgraded to a next higher tier, in real-time, and without changing the primary account number (PAN) associated with the cardholder's account.

In some embodiments, an upgrade manager facilies the upgrade of a user account in real-time while maintaining the same PAN. In an example, the PAN remains the same whenever the cardholder account is upgraded to a new, higher tier. This reduces processor usage and network bandwidth usage which would otherwise be expended updating the original PAN to a new PAN with every website, merchant and subscription service having the original PAN saved on file every time the user upgrades to the next higher tier. This results in reduced computing system resource usage associated with account tier upgrades. Further, the cardholder account is upgraded to the higher tier without requiring a separate transaction to be performed, i.e., the cardholder account is upgraded to the higher tier by upgrading the account within the current card-not-present (CNP) transaction. This further reduces computing resource and network bandwidth consumption.

Referring to the figures, examples of the disclosure enable an upgrade manager for dynamically upgrading a card account in real-time within a payment network during a card not present (CNP) transaction. In some examples, the upgrade manager requests consent to upgrade an account to a higher tier within the recipient system during the CNP transaction authorization. This enables a faster and more technologically efficient upgrade of cardholder accounts.

Other examples provide a mapping table for mapping personal account numbers (PAN) associated with a cardholder account to an upgrade code associated with a higher tier to upgrade an account from a first tier to a higher second tier while maintaining the same PAN for the account. This enables reduced computing system resource usage where the cardholder does not have to change the PAN following the update to the higher tier.

The computing device as programmed herein operates in an unconventional manner at least by obtaining consent for an upgrade during a CNP transaction authorization, and mapping a PAN for the account to a new upgrade code without changing the PAN. In this manner, the computing device is used in an unconventional way, and allows authorizing the CNP transaction at the higher tier using the new upgrade code mapped to the PAN, thus enabling a merchant-agnostic and industry-agnostic real-time card account tier upgrade within the recipient payment system. This improves the functioning of the underlying device by using less memory, processing, and bandwidth when changing tiers for a user.

Other examples provide a user interface (UI) device for displaying a real-time request for cardholder consent and/or confirmation of successful real-time upgrade of the cardholder's account from a first tier to a higher second tier. This provides improved user efficiency via UI interaction and increased user interaction performance.

Other examples enable auditing consent data and upgrade data associated with card account tier upgrades using a transaction reference ID associated with each account and used in common by the account issuer, recipient system and cardholder. Using the transaction reference ID, the upgrade manager can verify the time and manner in which the cardholder provided consent to upgrade the account to a different tier and/or verify one or more upgrades made to one or more accounts. This enables a reduced error rate and improved accuracy in verification of upgrade processes.

The real-time account tier upgrades performed by mapping upgrade codes to the account PANs further encourages greater card issuer loyalty to the recipient network having the upgrade manager. There is an ecological or sustainability advantage in that physical waste is minimized because physical account cards do not have to be re-issued with a new PAN each time the cardholder agrees to upgrade to a new tier. The same physical card can be used after the upgrade occurs as was used before the upgrade. Moreover, there is no need to set up additional bank identification numbers (BINs) with the network, which saves PANs, further contributing to reduction in computing resource usage.

Referring again to FIG. 1, an exemplary block diagram illustrates a system 100 for account tier upgrades during card-not-present (CNP) transactions in real-time. In the example of FIG. 1, the computing device 102 represents any device executing computer-executable instructions 104 (e.g., as application programs, operating system functionality, or both) to implement the operations and functionality associated with the computing device 102. The computing device 102, in some examples includes a mobile computing device or any other portable device. A mobile computing device includes, for example but without limitation, a mobile telephone, laptop, tablet, computing pad, netbook, gaming device, and/or portable media player. The computing device 102 can also include less-portable devices such as servers, desktop personal computers, kiosks, or tabletop devices. Additionally, the computing device 102 can represent a group of processing units or other computing devices.

In some examples, the computing device 102 has at least one processor 106 and a memory 108. The computing device 102, in other examples includes a user interface device 110.

The processor 106 includes any quantity of processing units and is programmed to execute the computer-executable instructions 104. The computer-executable instructions 104 are performed by the processor 106, performed by multiple processors within the computing device 102 or performed by a processor external to the computing device 102. In some examples, the processor 106 is programmed to execute instructions such as those illustrated in the figures (e.g., FIG. 5, FIG. 6, FIG. 7, FIG. 8, and FIG. 9).

The computing device 102 further has one or more computer-readable media, such as the memory 108. The memory 108 includes any quantity of media associated with or accessible by the computing device 102. The memory 108, in these examples, is internal to the computing device 102 (as shown in FIG. 1). In other examples, the memory 108 is external to the computing device (not shown) or both (not shown). The memory 108 can include read-only memory.

The memory 108 stores data, such as one or more applications. The applications, when executed by the processor 106, operate to perform functionality on the computing device 102. The applications can communicate with counterpart applications or services such as web services accessible via a network 112. In an example, the applications represent downloaded client-side applications that correspond to server-side services executing in a cloud.

In other examples, the user interface device 110 includes a graphics card for displaying data to the user and receiving data from the user. The user interface device 110 can also include computer-executable instructions (e.g., a driver) for operating the graphics card. Further, the user interface device 110 can include a display (e.g., a touch screen display or natural user interface) and/or computer-executable instructions (e.g., a driver) for operating the display. The user interface device 110 can also include one or more of the following to provide data to the user or receive data from the user: speakers, a sound card, a camera, a microphone, a vibration motor, one or more accelerometers, a BLUETOOTH® brand communication module, wireless broadband communication (LTE) module, global positioning system (GPS) hardware, and a photoreceptive light sensor. In a non-limiting example, the user inputs commands or manipulates data by moving the computing device 102 in one or more ways.

The network 112 is implemented by one or more physical network components, such as, but without limitation, routers, switches, network interface cards (NICs), and other network devices. The network 112 is any type of network for enabling communications with remote computing devices, such as, but not limited to, a local area network (LAN), a subnet, a wide area network (WAN), a wireless (Wi-Fi)

network, or any other type of network. In this example, the network 112 is a WAN, such as the Internet. However, in other examples, the network 112 is a local or private LAN. In this example, the network 112 includes a payment network associated with a payment system.

In some examples, the system 100 optionally includes a communications interface device 114. The communications interface device 114 includes a network interface card and/or computer-executable instructions (e.g., a driver) for operating the network interface card. Communication between the computing device 102 and other devices, such as but not limited to a user device 116 and/or a cloud server 118, can occur using any protocol or mechanism over any wired or wireless connection. In some examples, the communications interface device 114 is operable with short range communication technologies such as by using near-field communication (NFC) tags.

The user device 116 represents any device executing computer-executable instructions. The user device 116 can be implemented as a mobile computing device, such as, but not limited to, a wearable computing device, a mobile telephone, laptop, tablet, computing pad, netbook, gaming device, and/or any other portable device. The user device 116 includes at least one processor and a memory. The user device 116 can also include a user interface (UI) 120. The UI is a user interface device, such as, but not limited to, the user interface device 110. In this example, the user device 116 is a computing device associated with a cardholder or other user.

In this example, the cardholder (user) receives a notification 122 from an issuer of an account card and/or from the upgrade manager 130 indicating that an account associated with the physical account card is eligible for an upgrade from a current tier to a higher tier. As used herein, the term "tier" refers to a membership or benefits level in a plurality of different levels associated with an account. Each tier or level is accompanied by a different set of conditions, limitations, benefits, rewards, and other terms associated with an account. For example, if the account is a credit card account associated with a credit card, each tier in the plurality of tiers can be accompanied by different interest rates, different annual membership fees, different reward point percentages for different purchases, and other optional membership perks. Each higher tier of the account is associated with better terms, conditions, benefits, and rewards than the lower tiers.

The notification 122 is a notice including an identification of the account of the cardholder and an identification of the next higher tier which the cardholder is eligible to receive if the cardholder accepts the terms and conditions associated with the new tier. In some examples, the notification 122 includes the new terms and conditions associated with the new tier. The notification 122 is displayed to the cardholder via the UI 120 on the user device 116. The notification 122 is transmitted from the upgrade manager 130 to the user device 116 via the network 112. The notification 122 may be provided via an email, text message, or via a link to a webpage of the card issuer. In this example, when the cardholder logs in to the cardholder account, the cardholder's account information page includes the notification 122.

The cloud server 118 is a logical server providing services to the computing device 102 or other clients, such as, but not limited to, the user device 116. The cloud server 118 is hosted and/or delivered via the network 112. In some non-limiting examples, the cloud server 118 is associated with one or more physical servers in one or more data centers. In other examples, the cloud server 118 is associated with a distributed network of servers.

In some examples, the cloud server 118 is a web server hosting a webpage associated with the cardholder account. The cardholder logs into the webpage via the network 112 to access account information. In other examples, the cloud server 118 is associated with a merchant (acquirer) system. In these examples, the cloud server 118 transmits a request 124 to complete a card-not-present (CNP) transaction 126. The CNP transaction 126 is a transaction which a cardholder is attempting to complete using an account associated with a physical account card which is not present.

The CNP transaction request is transmitted to the computing device 102 via the network 112. The CNP transaction request 124 is a message containing a request associated with a CNP transaction 126 from an acquirer to a recipient. The transaction request optionally includes a user authentication request, a payment transaction request, a login request, etc. In some examples, the transaction request is associated with an issuer, such as a payment transaction request associated with withdrawal of funds from a bank account, payment using a payment card (credit card, debit card, etc.), or any other type of payment transaction In this non-limiting example, the CNP transaction 126 is a CNP payment transaction involving the purchase or lease of goods and/or services via a point-of-sale (POS) device, self-checkout (SCO) terminal, or other transaction related terminal. In other examples, the CNP transaction 126 is a transaction associated with a webpage or other online purchase transaction via a webpage associated with a merchant. The goods and/or services can include a subscription, membership fee, item purchase price, fee for access to online content, streaming services, equipment rental, or any other purchase or lease of goods and/or services.

The system 100 can optionally include a data storage device 128 for storing data, such as, but not limited to a mapping table 132 and/or a transaction record table 138. The mapping table 132 includes a code-to-tier mapping 134 and/or a personal account number (PAN)-to-code mapping 136. The code-to-tier mapping 134 is a mapping of each upgrade code associated with each account to a tier assigned to each account. The PAN is an account number used to identify an account of the cardholder, such as a credit card account, debit card account, rewards card account, gift card account, membership account, or any other type of card-related account. The PAN-to-code mapping 136 is a mapping of each cardholder account PAN to the current upgrade code assigned to the PAN.

The upgrade code 142 is used to identify the current tier 144 for each account via the mapping table 132. In other words, the upgrade code 142 is used to determine the current tier 144 by checking the code-to-tier mapping 134. The upgrade code may be implemented as any type of code, such as, but not limited to, an alphanumeric code. In other examples, the upgrade code is a series of numbers, a series of letters, a combination of numbers and letters, etc. In some examples, the code is an alphabetic code, such as, but not limited to, a code such as MCW (World Mastercard® Card), MPN (Prepaid Mastercard Insurance Card), MDW (World Elite Debit Mastercard®), etc. In these examples, the code includes three letters. However, the upgrade code can include any number of letters, numbers, symbols, or combination of letters, numbers and/or symbols.

The upgrade code 142 for a given account PAN is identified by checking the PAN-to-code mapping 136. Each time an account is approved for an upgrade 146 to a higher tier, the PAN for the account is mapped to a new upgrade code associated with the higher tier. In this manner, the account is upgraded without changing the PAN for the account. This reduces network bandwidth usage consumed in updating PAN numbers with various websites and merchants, thus enabling the system to operate more efficiently with reduced power usage and processor usage as well.

The data storage device 128 can include one or more different types of data storage devices, such as, for example, one or more rotating disks drives, one or more solid state drives (SSDs), and/or any other type of data storage device. The data storage device 128, in some examples, includes a redundant array of independent disks (RAID) array. In other non-limiting examples, the data storage device(s) provide a shared data store accessible by two or more hosts in a cluster. For example, the data storage device may include a hard disk, a redundant array of independent disks (RAID), a flash memory drive, a storage area network (SAN), or other data storage device. In other examples, the data storage device 128 includes a database, such as, but not limited to, the database 240 in FIG. 2.

The data storage device 128 in this example is included within the computing device 102, attached to the computing device, plugged into the computing device, or otherwise associated with the computing device 102. In other examples, the data storage device 128 includes a remote data storage accessed by the computing device via the network 112, such as a remote data storage device, a data storage in a remote data center, or a cloud storage.

The memory 108 in some examples stores one or more computer-executable components. Exemplary components include the upgrade manager 130, which, when executed by the processor 106 of the computing device 102, causes the computing device 102 to notify a cardholder that an account associated with a physical account-related card is eligible for upgrade 146 to a higher tier. In some examples, a set of eligibility rules are applied by the upgrade manager 130 to determine whether the account is eligible for the upgrade.

The eligibility rules are user-configurable rules generated by the issuer of the card account. The eligibility rules may differ from one issuer to another. In one example, the eligibility rules may specify that an account is eligible for an upgrade to a next higher tier if the account has been open and active for a predetermined period of time. In another example, an eligibility rule may specify that an account is eligible for an upgrade to a higher tier when the account usage reaches a minimum activity level, such as a threshold number of transactions and/or transactions amounting to a threshold amount completed using the account.

Subsequent to notifying the cardholder via the notification 122, the upgrade manager 130 receives the CNP transaction request 124. The upgrade manager 130 on the computing device is part of a recipient system, such as, but not limited to, a payment system. A payment system is a system associated with an issuer or payment network which works in conjunction with an account issuer to clear payment transaction requests associated with a payment account. However, the examples are not limited to a payment system.

In some examples, the upgrade manager 130 transmits a request 148 for consent 150 from the cardholder for the upgrade to the higher tier upon receiving the CNP transaction request 124 from the merchant (acquirer) system. The consent 150 is requested within the recipient system before authorizing the CNP transaction 126. The upgrade manager 130 receives the consent 150 of the cardholder before authorizing the CNP transaction 126. The upgrade manager 130 upgrades the account of the cardholder from the current tier 144 to the higher tier by associating an upgrade code 142 corresponding to the higher tier with the account PAN in the PAN-to-code mapping 136 of the mapping table 132.

In this example, the mapping table 132 is stored on a local data storage device 128. However, in other examples, the mapping table 132 is stored on a remote data store, such as, but not limited to, a cloud storage or a remote data storage device.

The upgrade manager 130 authorizes the transaction at the higher tier using the upgrade code 142 associated with the PAN, thus enabling a merchant-agnostic and industry-agnostic real-time card tier upgrade during transaction authentication and authorization within the payment system. In this manner, the cardholder is able to consent to upgrade and finalize the upgrade while checking out at a POS terminal without contacting the issuer directly or presenting the physical account card when providing consent to the upgrade and/or while the system performs the upgrade.

The upgrade manager 130 generates a confirmation 152 notification indicating the upgrade to the new, higher tier for the account is complete. The confirmation 152 is optionally displayed via the user interface device 110. In other examples, the confirmation 152 is transmitted to the user device 116 for viewing by the cardholder.

In some examples, the upgrade manager 130 stores data associated with the consent 150 and/or the upgrade 146 in the transaction record table 138. The transaction record table 138 is an audit log providing a record of changes to one or more accounts of one or more cardholders.

The consent data and upgrade data are recorded with a transaction reference identifier (ID) 140 number associated with the cardholder account. This enables the system to easily retrieve data associated with the upgrade using the transaction reference ID 140. The transaction reference ID number is applicable for the first authorization after consent is provided to the upgrade. The transaction reference ID 140 enables the system to track and store consent-related data, as well as retrieve consent data for auditing purposes. In this example, the consent is embedded consent obtained during a payment transaction.

In some examples, the upgrade manager 130 generates one or more icon(s) 154 associated with a plurality of accounts. In some examples, each icon represents the accounts associated with each tier. In other words, an icon for each tier is generated for display via a UI. I other examples, an icon is generated for each account or group of accounts. A group of accounts includes a range of PANs associated with a common base tier level, such as, a range of PANs for accounts at a silver level, PANs for accounts at a gold level, and/or a range of PANs for accounts associated with a platinum level.

In some examples, the upgrade manager determines the amount of use of each icon in the plurality of icons over a predetermined period of time. The upgrade manager ranks the icons based on the determined amount of use.

In other examples, the upgrade manager receives a user selection to organize each icon in the plurality of icons based on a specific criteria via a graphical user interface (GUI). The specific criteria are an amount of use of each icon. The upgrade manager 130 determines the amount of use of each icon using a processor that tracks how much memory has been allocated to each application (or account) associated with each icon over a predetermined period of time. In some examples, the plurality of icons is automatically arranged on the GUI based on the determined amount of use. For example, the upgrade manager automatically moves the most used icons to a position on the GUI closest to a start icon of the computer system based on the determined amount of use, or moves the most used icons to a top of the GUI.

In this example, the computing device 102 is associated with an issuer of the card account. However, in other examples, the upgrade manager 130 on the computing device 102 is part of a separate recipient system which works in coordination with an issuer system associated with an issuer of the card account to manage real-time upgrades of the account tiers.

The recipient system is a system associated with clearing a transaction request. The recipient system in some examples is associated with the issuer. In other examples, the recipient system is a separate system from the computing system of the issuer. In this example, the recipient system is a payment system associated with a payment network for clearing CNP transaction requests.

Figure 2:
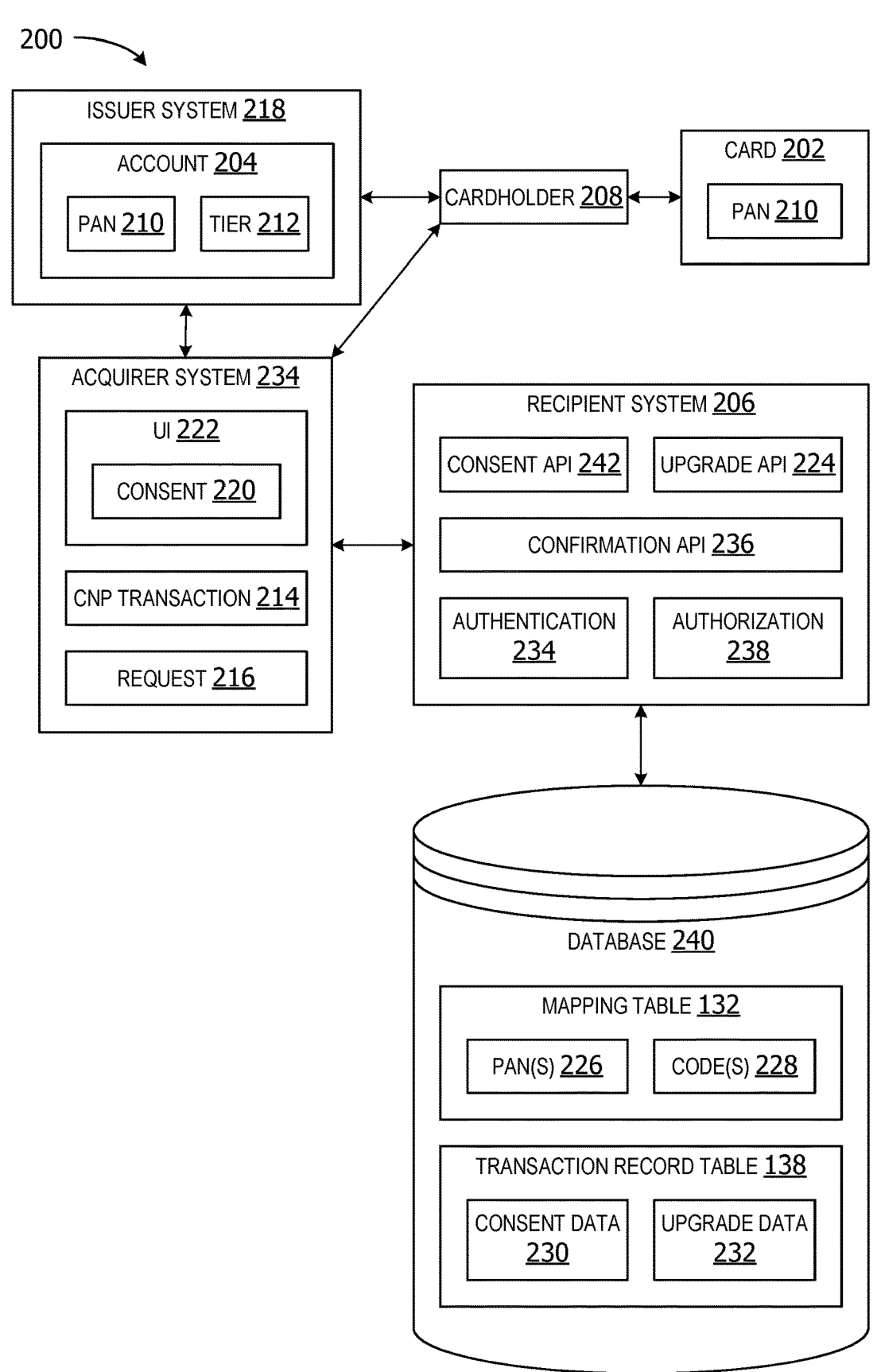
FIG. 2 is an exemplary block diagram illustrating a system for upgrading card account tiers using an upgrade code.

FIG. 2 is an exemplary block diagram illustrating a system 200 for upgrading card account tiers using an upgrade code. An upgrade manager associated with a recipient system 206 notifies a cardholder that the account 204 associated with the card 202 is eligible for upgrade to a higher tier. The recipient system 206 is a computing system associated with a network, such as, but not limited to, a payment system for clearing CNP transactions performed using a payment card, such as a credit card, debit card, gift card and/or other payment card.

The account has a PAN 210 associated with the current tier of the account. After notifying the cardholder 208, the recipient system 206 receives a request 216 for a CNP transaction 214 using the account 204 associated with the card 202. The account 204 is an account provided by an issuer. The issuer is an entity such as, but not limited to, a bank, credit card provider, etc. The issuer system 218 is a computing system associated with the issuer.

In some examples, upon receiving the CNP transaction request 216, a consent application programing interface (API) 242 requests a consent 220 from the cardholder 208 for the upgrade to the higher tier. The consent API 242 is a service that seeks the cardholder's consent for the upgrade. The consent API 242 in some examples is a service associated with an upgrade manager, such as, the upgrade manager 130 in FIG. 1.

The consent 220 is requested within the recipient system 206 before authorizing the CNP transaction 214. In this example, the request for consent is presented to the user via a UI 222. The user provides the consent 220 via the UI. In this example, the UI 222 is a GUI associated with a POS device and/or a SCO device enabling the cardholder to complete a transaction.

In some examples, the consent API 242 sends a request from the issuer to the cardholder via the recipient system 206. In some examples, the recipient system 206 is a system associated with a credit card issuer. Example code associated with the consent API 242 seeking consent from the cardholder is as follows:

```
<Seek Consent Request>
<Reference: #123>
<Approve upgrade: Y/N>
<Seek Consent Request/>
```

The consent is displayed in the one-time password (OTP) entering page. The cardholder can tick the checkbox for a positive consent. Example code associated with obtaining a consent response by the consent API 242 is as follows:

```
<Seek Consent Response>
<Reference: #123>
<Status: Approve/Decline>
<Status Code: 0>
<Seek Consent Response/>
```

If the recipient system 206 receives the consent 220 of the cardholder 208 before authorizing the CNP transaction 214, an upgrade API 224 upgrades the account of the cardholder to the higher tier. The upgrade API 224 communicates the upgraded tier against the card account number to the network. Example code associated with the upgrade API 224 sending an upgrade API request from an issuer to the recipient network is as follows:

```
<Upgrade Request>
<Reference: #123>
<PAN: >
<Current Brand product: MPL>
<New Brand product: MWH>
<Upgrade Request/>
```

The upgrade response is obtained by the upgrade API 224. The recipient network checks whether a new tier is already enabled for the issuer, else it declines the update.

```
<Upgrade Response>
<Reference: #123>
<Status: SUCCESS/DECLINE>
<Status Code: 0>
<Upgrade Response/>
```

As shown above, the same transaction reference ID (Reference: #123) is used in common across all APIs, including the consent API 242, the confirmation API 236, and the upgrade API 224. Thus, the same transaction reference ID for a given CNP transaction is used for all communications between the cardholder, issuer, and the payment network associated with the account tier and account tier upgrades.

An upgrade code is mapped to the PAN 210 in the mapping table 132. The mapping table 132 includes one or more PAN(s) 226 mapped to one or more upgrade code(s) 228. The transaction record table 138 includes stored consent data 230 and/or upgrade data 232 associated with one or more accounts, such as the account 204. The consent data 230 is data associated with cardholder consent provided for upgrading an account to a higher tier. The consent data optionally includes date consent was provided, name of the cardholder providing the consent, location in which the consent was provided, method of consent, type of consent, contents of the consent, etc.

The upgrade data 232 includes data associated with all tiers for a given account. Thus, each time an account is upgraded to a new tier, the upgrade data 232 is updated to include data associated with the new tier. If an account is upgraded to a new tier three time, the upgrade data includes data associated with all three tiers even though the account currently has only a single tier assigned to the account. Thus, the upgrade data 232 includes data associated with both the current tier as well as all previous tiers.

The mapping table 132 and/or the transaction record table 138 are stored on a data store, such as, but not limited to, a database 240. The database 240 is any type of database, such as, but not limited to, a relational database.

The upgrade code for the higher tier is mapped to the PAN 210 within the mapping table 132 during authentication 234 of the cardholder and cardholder account. A confirmation API 236 confirms the account 204 is eligible for the upgrade to the higher tier. The confirmation API 236 confirms the upgrade to the cardholder in some examples by sending a confirmation request from an issuer computing device or from recipient computing device to the cardholder. Example code associated with confirming the upgrade to the higher tier is as follows:

```
<Confirmation Request>
<Reference: #123>
<PAN: >
<New Brand product: MWH>
<Confirmation Request/>
```

Example code associated with the confirmation API 236 receiving a response from the cardholder is as follows:

```
<Confirmation Response>
<Reference: #123>
<Status: SUCCESS/DECLINE>
<Status Code: 0>
<Confirmation Response/>
```

If the confirmation API 236 confirms the account is eligible for upgrade, authorization 238 is provided for the CNP transaction at the higher tier. In other words, the CNP transaction is approved with the benefits associated with the higher tier. However, if consent 220 is not received for the upgrade (e.g., within a threshold amount of time), the CNP transaction is authorized at the previous tier 212. Thus, the CNP transaction can be completed even if the upgrade to the higher tier is unsuccessful. The upgraded tier is applicable for every subsequent transaction performed using the account.

In some examples, the consent API 242, the upgrade API 224, and the confirmation API 236 are associated with an upgrade manager component, such as, but not limited to, the upgrade manager 130 in FIG. 1. The upgrade manager utilizes the consent API 242, the upgrade API 224, and the confirmation API 236 to facilitate upgrading of cardholder accounts to one or more higher card account tiers.

In this example, the issuer system 218 and the recipient system 206 are two separate computing systems. However, in other examples, the issuer system and the recipient system associated with the upgrade manager are implemented as the same system. In these examples, the upgrade manager is part of the issuer system rather than being implemented as a separate recipient system which communicates with the issuer system 218.

Figure 3:
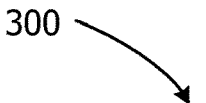
FIG. 3 is an exemplary block diagram illustrating an upgrade manager.
Figure 3:
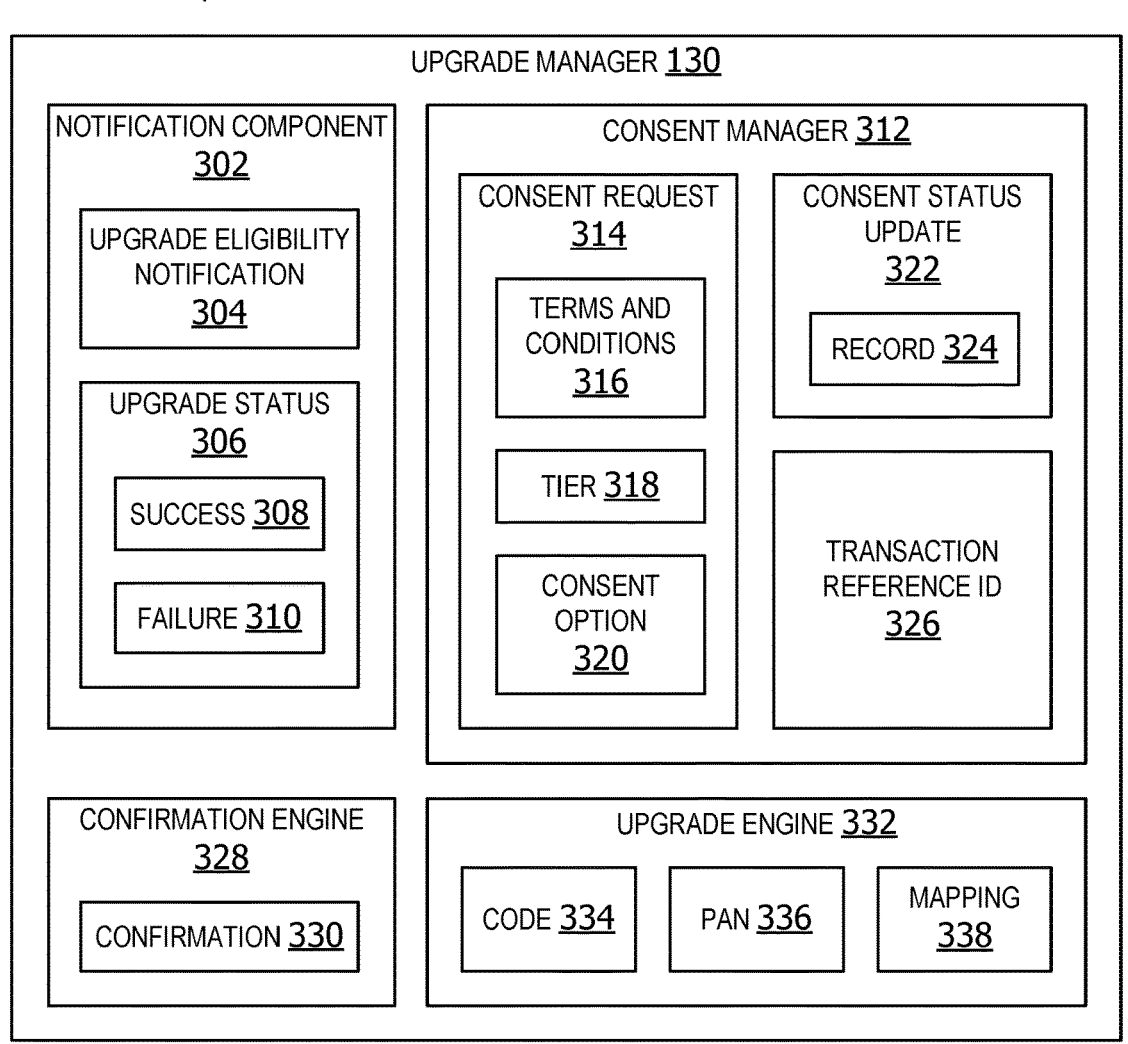

Turning now to FIG. 3, an exemplary block diagram 300 illustrating an upgrade manager 130 is shown. The upgrade manager 130, in this example, is a software component associated with a recipient computing system, such as, but not limited to, the recipient system 206 in FIG. 2.

In some examples, the upgrade manager 130 includes a notification component 302. The notification component 302 generates an upgrade eligibility notification 304 indicating that an account associated with a cardholder is eligible for an upgrade to a higher tier. The higher tier may be a next higher tier or any other tier which is associated with better terms, conditions, benefits and/or rewards than the current tier of the account. The upgrade eligibility notification 304 is transmitted to a computing device associated with the cardholder using the account to complete a CNP transaction, such as, but not limited to, a POS device and/or a SCO device.

In other examples, the notification component 302 generates an upgrade status 306 notification indicating whether upgrade of an account to a higher tier is a success 308 or a failure 310. The upgrade status 306 is optionally displayed to the cardholder via the merchant (acquirer) system or via a user device associated with the cardholder.

The upgrade manager 130, in some examples, includes a consent manager 312. The consent manager 312 generates a consent request 314. The consent request 314 is a request for a cardholder's consent to an upgrade from the current tier of the account to a higher tier. The consent request 314 optionally includes terms and conditions 316 associated with the higher tier 318 and/or a consent option 320. The consent option 320 provides the cardholder with an option to agree to the upgrade or reject the upgrade. In this example, the consent manager 312 is associated with a consent API, such as, but not limited to, the consent API 242 in FIG. 2.

The consent manager 312 creates a record 324 representing a consent status update 322 within an upgrade record for the account, such as, but not limited to, the transaction record table 138. The consent status update 322 includes data indicating whether the cardholder consented to the upgrade or rejected (refused consent) to the upgrade to the higher tier, such as, but not limited to, the consent data 230 in FIG. 2. The consent status data is mapped to a transaction reference ID 326. The transaction reference ID 326 is an identifier associated with the CNP transaction, such as, the transaction reference ID 140 in FIG. 1.

In some examples, a confirmation engine 328 provides confirmation 330 indicating that the account is still eligible for the upgrade and the account has not already been upgraded to the proposed higher tier. The confirmation engine 328 is associated with a confirmation API, such as, but not limited to, the confirmation API 236 in FIG. 2.

If confirmation is successful, an upgrade engine 332 performs a mapping 338 of an upgrade code 334 associated with the new, higher tier to the PAN 336 of the account. The upgrade engine 332 is optionally associated with an upgrade API, such as, but not limited to, the upgrade API 224 in FIG. 2.

Figure 4:
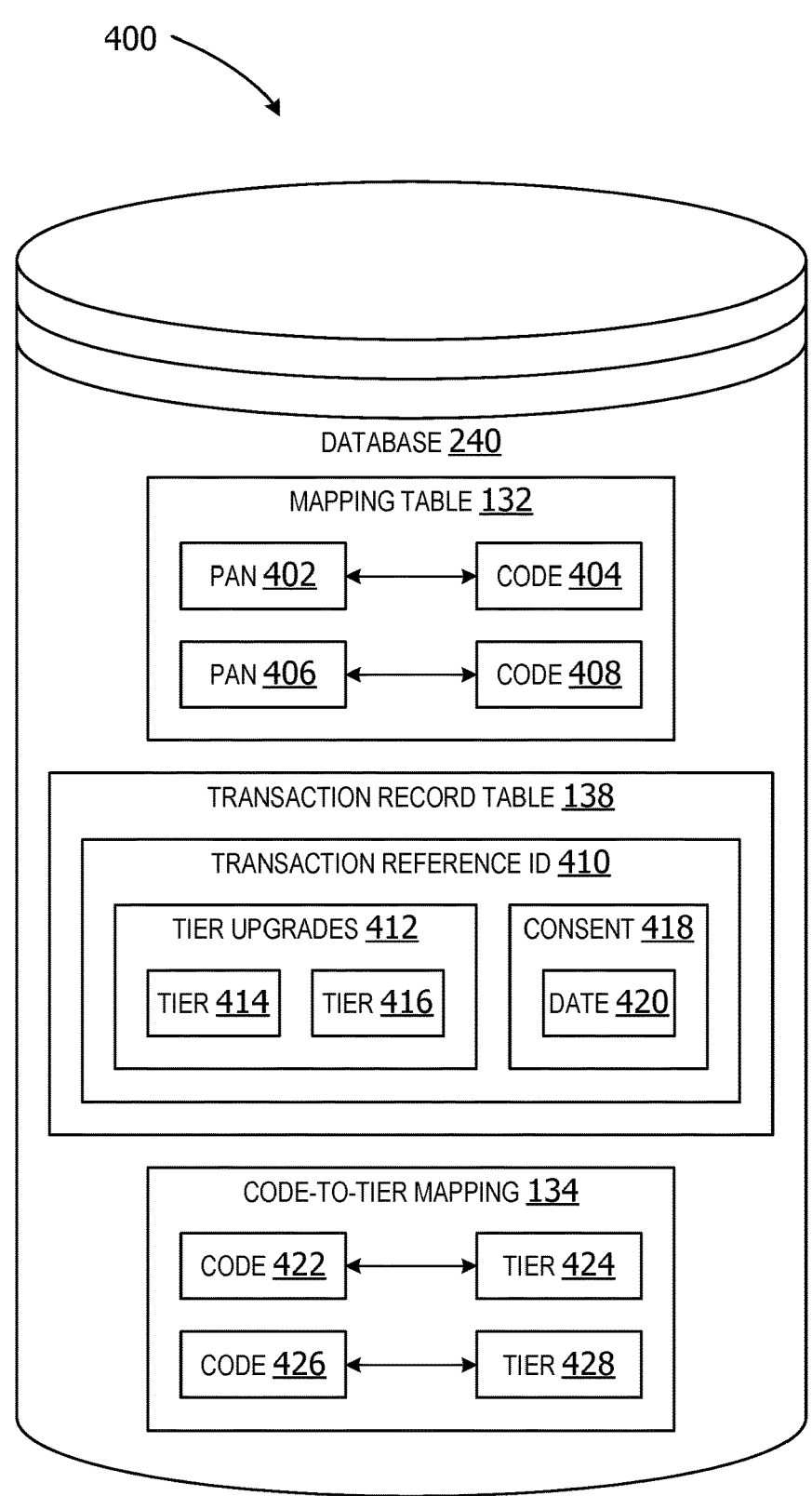
FIG. 4 is an exemplary block diagram illustrating a database for storing data associated with upgrading a card account in real-time during a CNP transaction.

FIG. 4 is an exemplary block diagram 400 illustrating a database 240 for storing data associated with upgrading a card account in real-time during a CNP transaction. In some examples, an upgrade code mapping table 132 maps one or more PANs to one or more upgrade codes. In this example, a PAN 402 is mapped to an upgrade code 404. Another PAN 406 is mapped to another upgrade code 408.

In this example, two PANs are mapped to two upgrade codes. However, the examples are not limited to mapping two PANs to two upgrade codes. In other examples, the mapping table includes one or more PANs mapped to one or more different upgrade codes.

In other examples, the database 240 includes transaction record table 138 storing data associated with a transaction reference ID 410. Tier upgrades 412 include data associated with every tier upgrade associated with an account. In this example, the transaction record table 138 includes data associated with an original base tier 414 of the account. The account was also upgraded to a higher tier 416. Consent 418 to the upgrade to the higher tier 416 is also recorded. The consent 418 data optionally include the date 420 of the upgrade to the higher tier 416.

Code-to-tier mapping 134 in some examples includes mapping of each upgrade code to the corresponding tier associated with the code. In this example, a first upgrade code 422 maps to a first tier 424. A second upgrade code 426 maps to a second tier 428. However, the examples are not limited to mapping two codes to two tiers. The code-to-tier mapping 134 can include mappings of one or more codes mapped to one or more different tiers.

Figure 5:
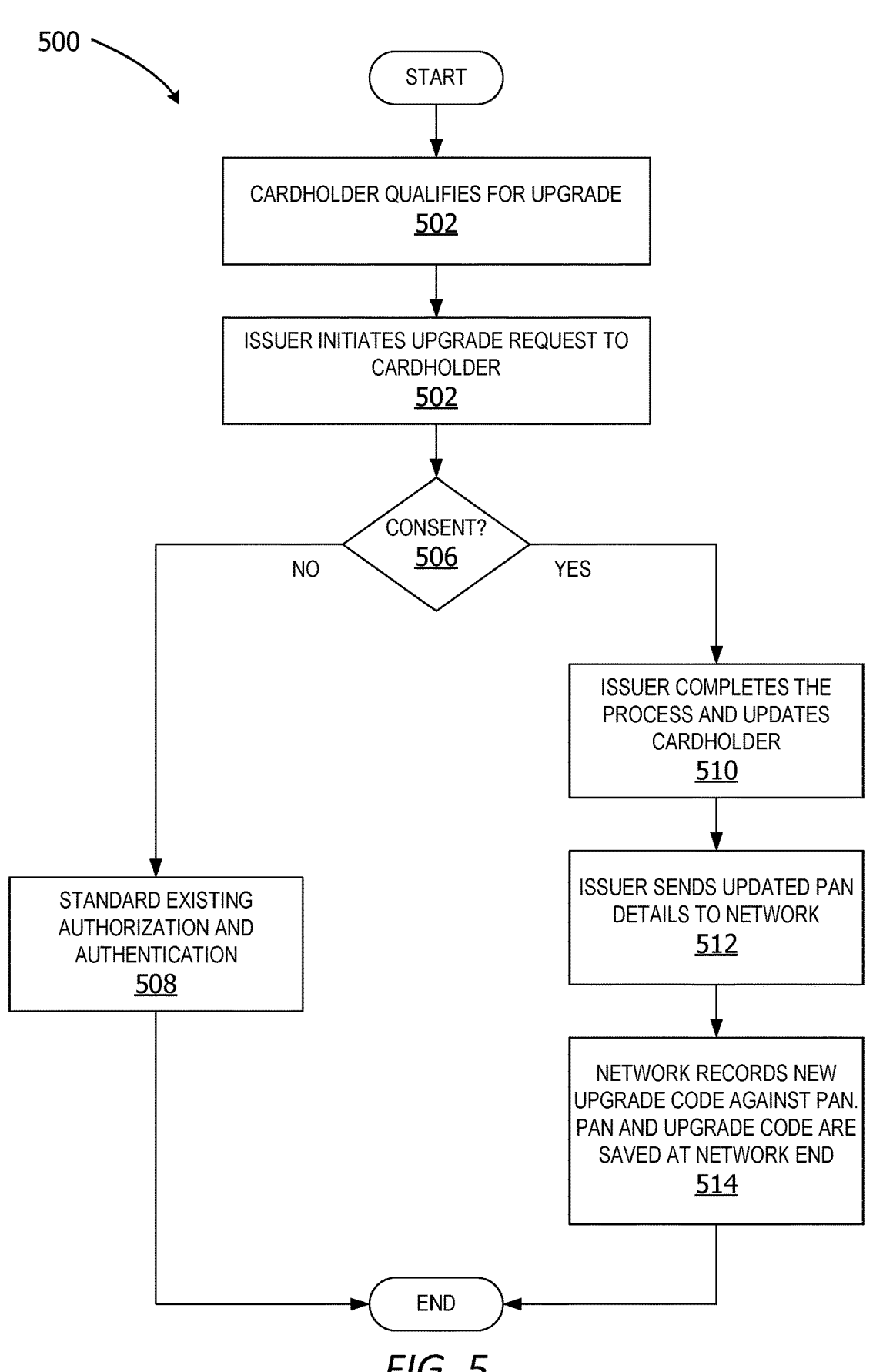
FIG. 5 is an exemplary flow chart illustrating operation of the computing device to obtain consent for upgrading a card account tier in real time during a CNP transaction authentication.

Referring now to FIG. 5, an exemplary flow chart illustrating operation of the computing device to obtain consent for upgrading a card account tier in real time during a CNP transaction authentication is shown. The process 500 of FIG. 5 is performed by an upgrade manager component, executing on a computing device, such as the computing device 102 or the user device 116 in FIG. 1.

The process begins when a cardholder qualifies for an upgrade to a higher tier at 502. The issuer initiates an upgrade request to the cardholder during authentication of a CNP transaction at 504. A determination is made whether consent is received from the cardholder at 506. If not, the system performs standard existing authorization and authentication with the current tier of the account at 508. The process terminates thereafter.

If consent is received from the cardholder at 506, the issuer updates the cardholder at 510. The issuer sends an updated PAN details with an upgrade code associated with the higher tier to the recipient network at 512. The recipient network records the new upgrade code against the PAN. The PAN and upgrade code are saved at the network end at 514. The process terminates thereafter.

While the operations illustrated in FIG. 5 are performed by a computing device, aspects of the disclosure contemplate performance of the operations by other entities. In a non-limiting example, a cloud service performs one or more of the operations. In another example, one or more computer-readable storage media storing computer-readable instructions may execute to cause at least one processor to implement the operations illustrated in FIG. 5.

Figure 6:
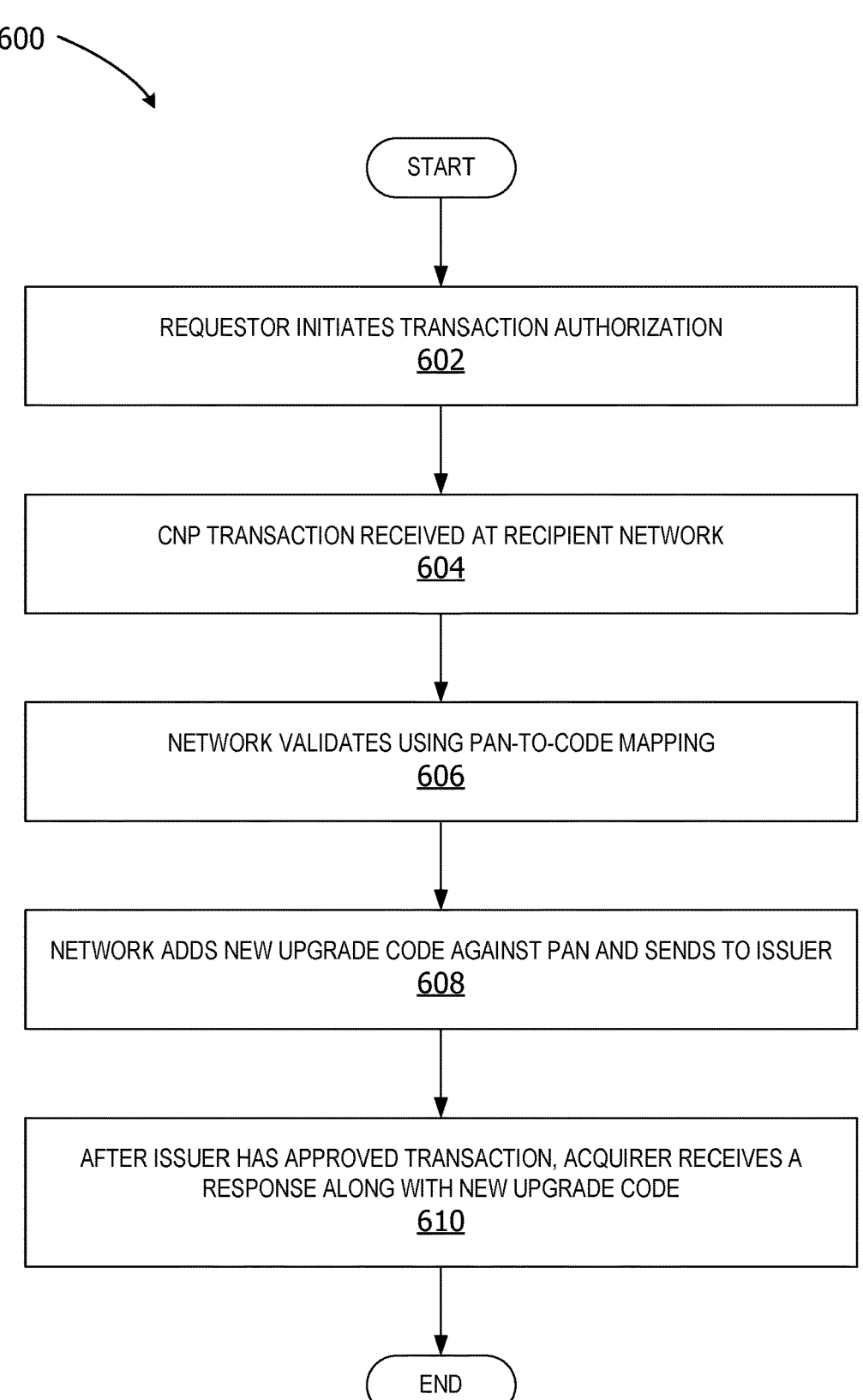
FIG. 6 is an exemplary flow chart illustrating operation of the computing device for mapping a new upgrade code to a PAN during a transaction authorization.

FIG. 6 is an exemplary flow chart illustrating operation of the computing device for mapping a new upgrade code to a PAN during a transaction authorization. The process 600 of FIG. 6 is performed by an upgrade manager component, executing on a computing device, such as the computing device 102 or the user device 116 in FIG. 1.

The process begins when a requestor initiates a CNP transaction authorization at 602. The CNP transaction is received at 604. The network validates using the PAN-to-code mapping at 606. The network in some examples is a payment network. The mapping is stored in a database lookup table, such as, but not limited to, the database 240 in FIG. 2 and FIG. 4. The network adds the new upgrade code for the higher tier against the PAN and sends it to the issuer at 608. After the issuer approves the transaction, the acquirer receives a response along with the new upgrade code at 610. The process terminates thereafter.

While the operations illustrated in FIG. 6 are performed by a computing device, aspects of the disclosure contemplate performance of the operations by other entities. In a non-limiting example, a cloud service performs one or more of the operations. In another example, one or more computer-readable storage media storing computer-readable instructions may execute to cause at least one processor to implement the operations illustrated in FIG. 6.

Figure 7:
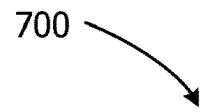
FIG. 7 is an exemplary flow chart illustrating operation of the computing device to clear a CNP transaction using an account with an upgrade code associated with a current tier of the account.
Figure 7:
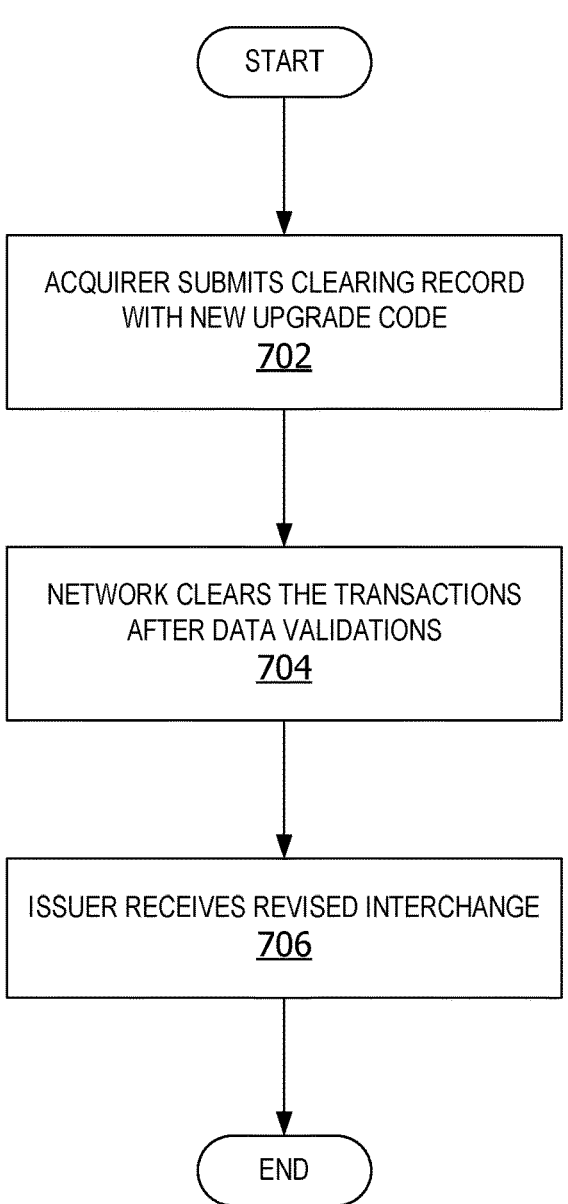

FIG. 7 is an exemplary flow chart illustrating operation of the computing device to clear a CNP transaction using an account with an upgrade code associated with a current tier of the account. The process 700 of FIG. 7 is performed by an upgrade manager component, executing on a computing device, such as the computing device 102 or the user device 116 in FIG. 1.

The process begins when an acquirer submits a clearing record with a new upgrade code at 702. The clearing record is a record associated with clearing a CNP transaction using an account of an account holder eligible for an account upgrade to a higher tier. The network clears the CNP transaction after data validations at 704. The data validations include validating the transaction using the account details associated with the current tier or the higher tier if the authentication phase of the transaction processing was successful. The issuer receives a revised interchange at 706. The process terminates thereafter.

While the operations illustrated in FIG. 7 are performed by a computing device, aspects of the disclosure contemplate performance of the operations by other entities. In a non-limiting example, a cloud service performs one or more of the operations. In another example, one or more computer-readable storage media storing computer-readable instructions may execute to cause at least one processor to implement the operations illustrated in FIG. 7.

Figure 8:
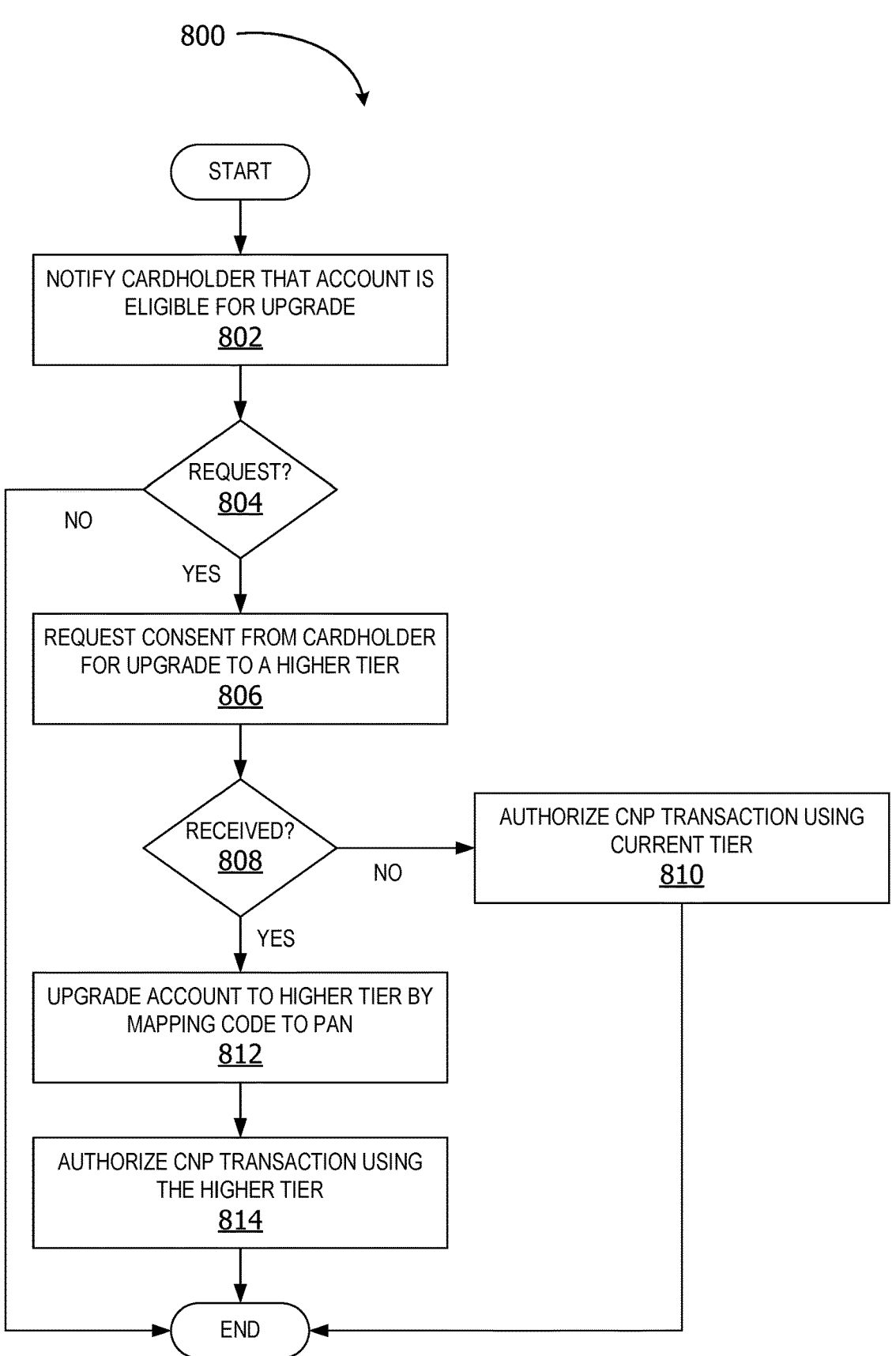
FIG. 8 is an exemplary flow chart illustrating operation of the computing device to perform real-time upgrade of an account tier within a payment network during a transaction.

Turning now to FIG. 8, an exemplary flow chart illustrating operation of the computing device to perform real-time upgrade of an account tier within a payment network during a transaction is shown. The process 800 of FIG. 8 is performed by an upgrade manager component, executing on a computing device, such as the computing device 102 or the user device 116 in FIG. 1.

The process begins by notifying a cardholder that the cardholder's account is eligible for an upgrade to a higher tier at 802. A determination is made whether a CNP transaction request is received at 804. If yes, consent is requested from the cardholder at 806. The consent is requested to upgrade the cardholder account to the higher tier. A determination is made whether consent is received from the cardholder at 808. If not, the CNP transaction is authorized using the current tier associated with the account at 810. The process terminates thereafter.

If consent is received at 808, the account is upgraded to the higher tier by mapping a new upgrade code associated with the higher tier to the PAN for the account at 812. The CNP transaction is authorized using the higher tier at 814. The process terminates thereafter.

While the operations illustrated in FIG. 8 are performed by a computing device, aspects of the disclosure contemplate performance of the operations by other entities. In a non-limiting example, a cloud service performs one or more of the operations. In another example, one or more computer-readable storage media storing computer-readable instructions may execute to cause at least one processor to implement the operations illustrated in FIG. 8.

Figure 9:
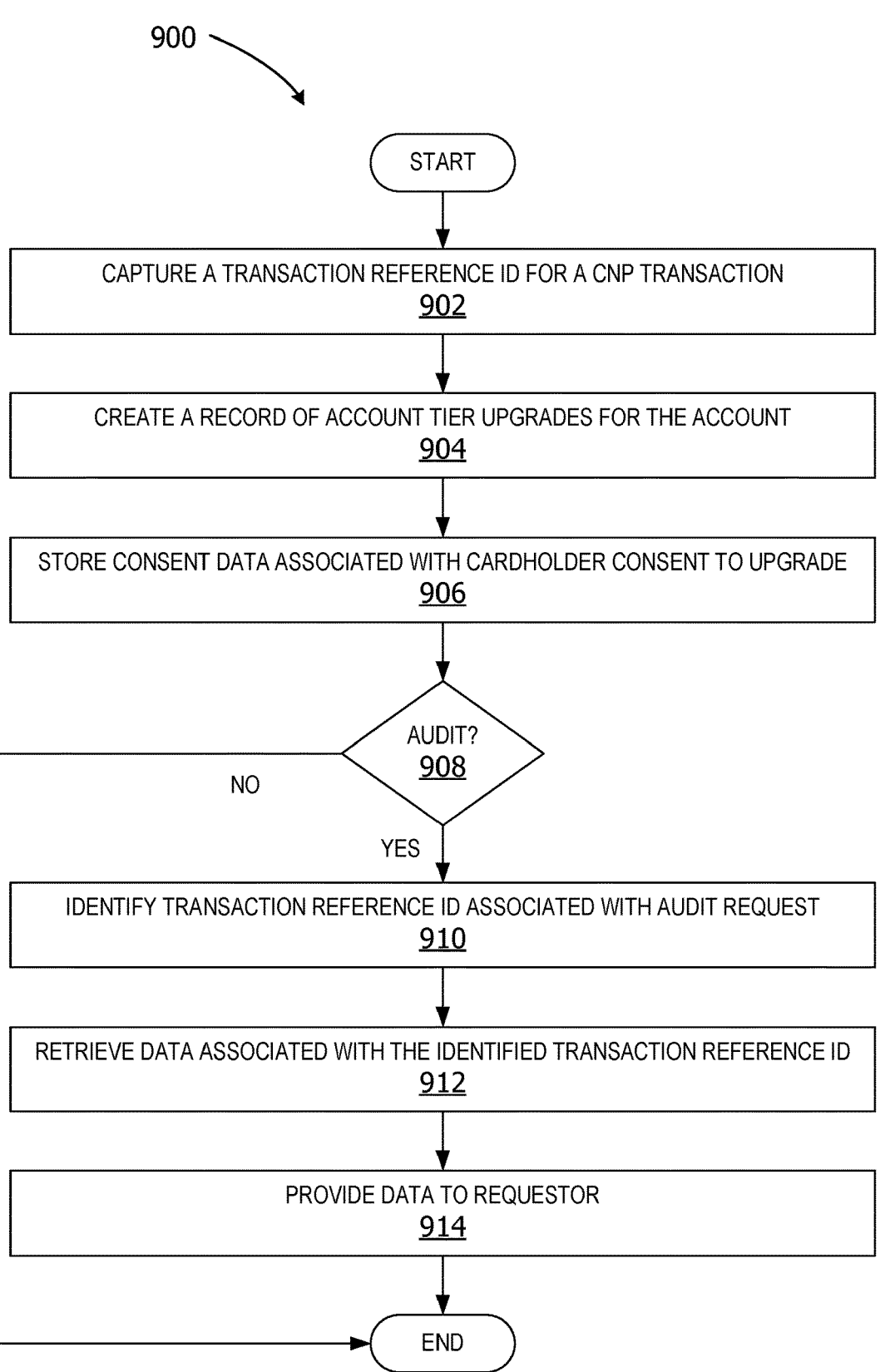
FIG. 9 is an exemplary flow chart illustrating operation of the computing device to capture a transaction reference identifier (ID) associated with an account tier upgrade for tracking and auditing upgrade and consent data associated with an account.

FIG. 9 is an exemplary flow chart illustrating operation of the computing device to capture a transaction reference identifier (ID) associated with an account tier upgrade for tracking and auditing upgrade and consent data associated with an account. The process 900 of FIG. 9 is performed by an upgrade manager component, executing on a computing device, such as the computing device 102 or the user device 116 in FIG. 1.

The process begins by capturing a transaction reference ID for a CNP transaction at 902. The upgrade manager creates a record of account tier upgrade for the account at 904. If an upgrade record already exists for the account, the upgrade manager updates the record for the current transaction using the transaction reference ID. The upgrade manager stores consent data associated with cardholder consent to upgrade to higher tier in the record at 906. A determination is made whether an audit request is received at 908. If no, the process terminates. If yes, the upgrade manager identifies the transaction reference ID associated with the audit request at 910. The upgrade manager retrieves data associated with the identified transaction reference ID responsive to the audit request at 912. The upgrade manager provides the data responsive to the audit request to the requestor associated with the audit request at 914. The process terminates thereafter.

While the operations illustrated in FIG. 9 are performed by a computing device, aspects of the disclosure contemplate performance of the operations by other entities. In a non-limiting example, a cloud service performs one or more of the operations. In another example, one or more computer-readable storage media storing computer-readable instructions may execute to cause at least one processor to implement the operations illustrated in FIG. 9.

Exemplary Operating Environment

Figure 10:
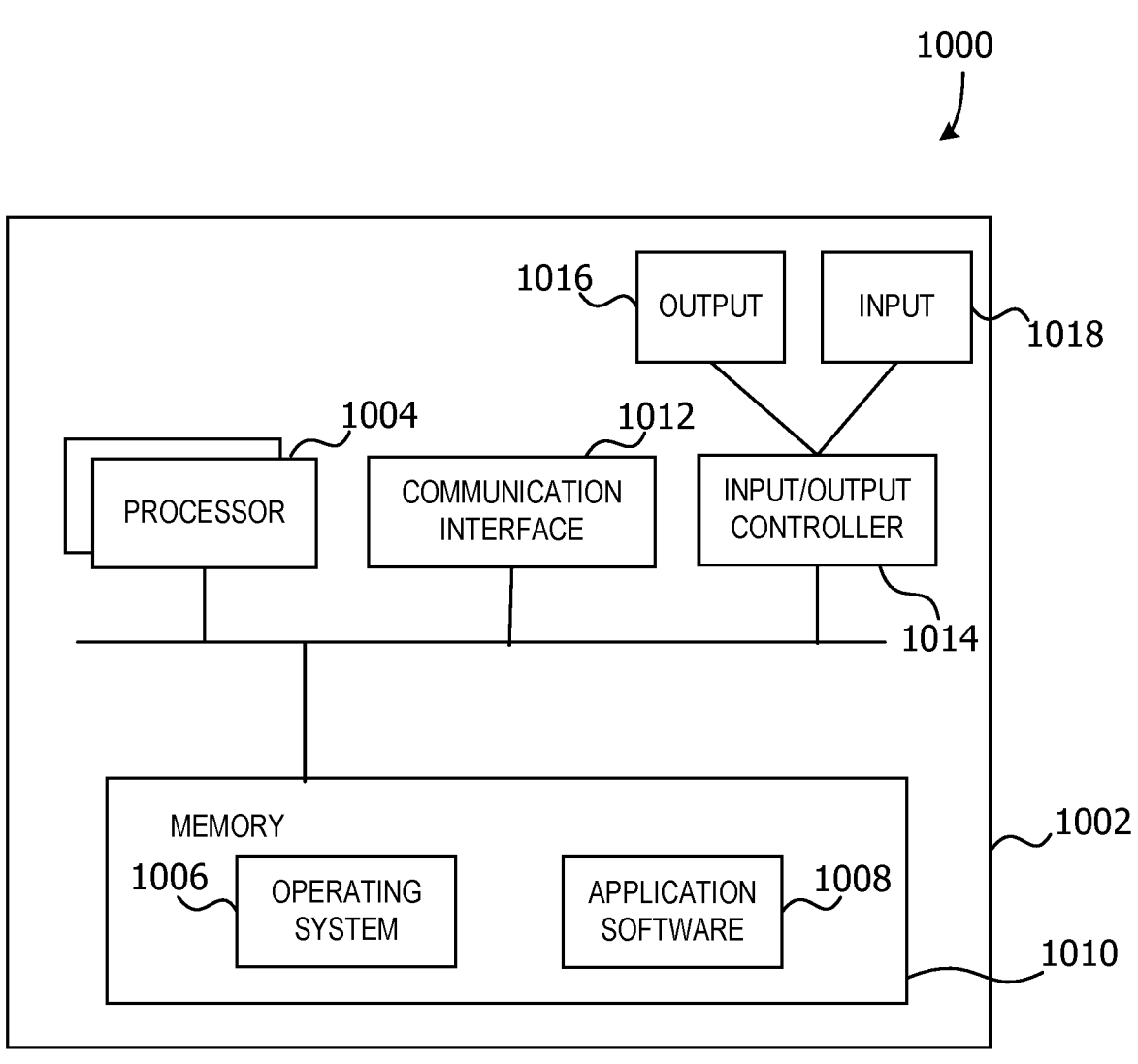
FIG. 10 is an exemplary block diagram illustrating a computing device suitable for implementing various aspects of the disclosure.

The present disclosure is operable with a computing apparatus according to an embodiment as a functional block diagram 1000 in FIG. 10. In an example, components of a computing apparatus 1002 are implemented as a part of an electronic device according to one or more embodiments described in this specification. The computing apparatus 1002 is a computing device, such as, but not limited to, the computing device 102 in FIG. 1.

The computing apparatus 1002 comprises one or more processors, such as the processor 1004 which can be microprocessors, controllers, or any other suitable type of processors for processing computer executable instructions to control the operation of the electronic device. The processor 1004 is a processor such as, but not limited to, the processor 106 in FIG. 1. Alternatively, or in addition, the processor 1004 is any technology capable of executing logic or instructions, such as a hardcoded machine. In some examples, platform software comprising an operating system 1006 or any other suitable platform software is provided on the apparatus 1002 to enable application software 1008 to be executed on the device. In some examples, receiving and correcting transaction request messages is accomplished by software, hardware, and/or firmware.

In some examples, computer executable instructions are provided using any computer-readable media that is accessible by the computing apparatus 1002. Computer-readable media include, for example, computer storage media such as a memory 1010 and communications media. The memory 1010 is a device, such as, but not limited to, the memory 108 in FIG. 1.

Computer storage media, such as a memory 1010, include volatile and non-volatile, removable, and non-removable media implemented in any method or technology for storage of information such as computer readable instructions, data structures, program modules or the like. Computer storage media include, but are not limited to, Random Access Memory (RAM), Read-Only Memory (ROM), Erasable Programmable Read-Only Memory (EPROM), Electrically Erasable Programmable Read-Only Memory (EEPROM), persistent memory, phase change memory, flash memory or other memory technology, Compact Disk Read-Only Memory (CD-ROM), digital versatile disks (DVD) or other optical storage, magnetic cassettes, magnetic tape, magnetic disk storage, shingled disk storage or other magnetic storage devices, or any other non-transmission medium that can be used to store information for access by a computing apparatus.

In contrast, communication media may embody computer readable instructions, data structures, program modules, or the like in a modulated data signal, such as a carrier wave, or other transport mechanism. As defined herein, computer storage media does not include communication media. Therefore, a computer storage medium should not be interpreted to be a propagating signal per se. Propagated signals per se are not examples of computer storage media. Although the computer storage medium (the memory 1010) is shown within the computing apparatus 1002, it will be appreciated by a person skilled in the art, that, in some examples, the storage is distributed or located remotely and accessed via a network or other communication link (e.g., using a communication interface 1012).

Further, in some examples, the computing apparatus 1002 comprises an input/output controller 1014 configured to output information to one or more output devices 1016, for example a display or a speaker, which are separate from or integral to the electronic device. Additionally, or alternatively, the input/output controller 1014 is configured to receive and process an input from one or more input devices 1018, for example, a keyboard, a microphone, or a touchpad. In one example, the output device 1016 also acts as the input device. An example of such a device is a touch sensitive display. The input/output controller 1014 in other examples outputs data to devices other than the output device, e.g., a locally connected printing device. In some examples, a user provides input to the input device(s) 1016 and/or receives output from the output device(s) 1018.

The functionality described herein can be performed, at least in part, by one or more hardware logic components. The computing apparatus 1002 is configured by the program code when executed by the processor 1004 to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Program-specific Standard Products (ASSPs), System-on-a-chip systems (SOCs), Complex Programmable Logic Devices (CPLDs), Graphics Processing Units (GPUs).

ADDITIONAL EXAMPLES

In some examples, the system provides an upgrade manager that upgrades a card account to a next card tier without changing the PAN where consent is given during a CNP transaction, such as an online transaction. The upgrade to the next higher tier occurs in real-time within the payment system. The system maps the PAN at the issuer level. An upgrade code is sent to the acquirer that identifies a PAN in an upgraded tier. The network maintains the mapping between the PAN and the upgrade code.

In other examples, a system upgrade is not required to implement the upgrade manager in a pre-existing payment system. If the upgrade to the next higher tier fails, the transaction does not fail. Instead, the transaction is completed using the previous tier.

In an example scenario, a cardholder has a credit/debit card which the cardholder (user) wants to upgrade or is eligible for upgrade based on an issuer bank's criteria for upgrade to a next higher tier. The cardholder is notified of the upgrade via a short message/messaging service (SMS)/email notification, where the cardholder can check the details of the upgrade. The next time the cardholder transacts online using the card account, consent is sought for the card account upgrade during the authentication phase of the transaction process. The cardholder and issuer complete the card account upgrade process. The card account is upgraded to a higher tier in real-time in the issuer's systems and the same is informed to the network scheme as well. The authorization of the transaction happens in the upgraded tier for current transaction and every subsequent transaction on the card account. The acquirer processes the clearing in the upgraded tier, which results in a revised interchange for the issuers. The card account number (PAN) remains the same.

Alternatively, or in addition to the other examples described herein, examples include any combination of the following:

capture, by a recipient network, a transaction reference identifier (ID) of the CNP transaction, the transaction reference ID being common across the cardholder, an issuer of the payment card, and the payment network;

create a record of account tier upgrades associated with the account and consent obtained from the cardholder within a transaction record table, wherein the record of account tier upgrades and upgrade consents are associated with the transaction reference ID;

receive, by the recipient network, an audit request associated with the CNP transaction from a requestor;

retrieve consent data associated with the consent obtained from the cardholder from the transaction record table using the transaction reference ID;

present the consent data to the requestor via a user interface device;

receive, by the recipient network, an audit request associated with the CNP transaction from a requestor, wherein the audit request comprises a request for information associated with previous upgrades associated with the account of the cardholder;

retrieve the record of the account tier upgrades associated with the account from the transaction record table using the transaction reference ID;

present upgrade data obtained from the record to the requestor via a user interface device;

map the PAN to the upgrade code in an upgrade code mapping stored on a data storage device;

receive a second CNP transaction request using the account associated with the card;

determine whether the cardholder is eligible for a second upgrade to a next higher tier;

responsive to determining the cardholder is eligible, request a second consent from the cardholder for the upgrade to the next higher tier, wherein the second consent is requested within the recipient system before authorizing the second CNP transaction;

responsive to receiving the second consent of the cardholder, upgrade the account of the cardholder to the next higher tier by mapping a second upgrade code corresponding to the next higher tier with the PAN;

authorize the second CNP transaction at the next higher tier using the second upgrade code associated with the PAN in real-time during authorization of the second CNP transaction;

generate a plurality of icons associated with a plurality of accounts, each account in the plurality of accounts associated with a tier in a plurality of tiers;

determining, by a processor, the amount of use of each icon in the plurality of icons over a predetermined period of time;

ranking the icons, by the processor, based on the determined amount of use;

notifying a cardholder that an account associated with a card is eligible for upgrade to a higher tier, the account having a primary account number (PAN), wherein the PAN is associated with a first upgrade code corresponding to a first tier;

subsequent to notifying the cardholder, receiving, by a recipient system, a card-not-present (CNP) transaction request associated with a CNP transaction using the account associated with the card;

upon receiving the CNP transaction request, requesting a consent from the cardholder for the upgrade to the higher tier, wherein the consent is requested within the recipient system before authorizing the CNP transaction;

receiving the consent of the cardholder before authorizing the CNP transaction;

upgrading the account of the cardholder to the higher tier by mapping a second upgrade code corresponding to a second tier with the PAN;

authorizing the CNP transaction at the second tier using the second upgrade code mapped to the PAN, thus enabling a merchant-agnostic and industry-agnostic real-time card tier upgrade within the payment system;

capturing, by a recipient network, a transaction reference identifier (ID) of the CNP transaction, the transaction reference ID being common across the cardholder, an issuer of the payment card, and the payment network;

creating a record of account tier upgrades associated with the account and upgrade consents obtained from the cardholder within a transaction record table, wherein the record of account tier upgrades and upgrade consents are associated with the transaction reference ID;

receiving, by the recipient network, an audit request associated with the CNP transaction from a requestor user device;

retrieving consent data associated with the consent obtained from the cardholder from the transaction record table using the transaction reference ID;

providing the consent data to the requestor user device via a network;

receiving, by the recipient network, an audit request associated with the CNP transaction from a requestor user device, wherein the audit request comprises a request for information associated with previous upgrades associated with the account of the cardholder;

retrieving the record of the account tier upgrades associated with the account from the transaction record table using the transaction reference ID;

providing upgrade data obtained from the record to the requestor user device via a network;

mapping the PAN to the second upgrade code in an upgrade code mapping stored on a data storage device;

generating an upgrade notification informing the user of successful upgrade of the account from the first tier to the second tier;

presenting the upgrade notification to the user via a user interface device;

receiving, via a graphical user interface (GUI), a user selection to organize each icon in the plurality of icons based on a specific criteria, wherein the specific criteria is an amount of use of each icon;

determining the amount of use of each icon using a processor that tracks how much memory has been allocated to each application associated with each icon over a predetermined period of time;

automatically moving the most used icons to a position on the GUI closest to a start icon of the computer system based on the determined amount of use;

providing the consent data to the requestor user device via a network;

providing upgrade data obtained from the record to the requestor user device via a network;

responsive to a failure to receive the consent for the upgrade to the second tier from the cardholder, authorizing the CNP transaction at the first tier;

receiving, via the GUI, a user selection to organize each icon in the plurality of icons based on a specific criteria, wherein the specific criteria is an amount of use of each icon;

determining the amount of use of each icon using a processor that tracks how much memory has been allocated to each application associated with each icon over a predetermined period of time; and automatically moving the most used icons to a position on the GUI closest to a start icon of the computer system based on the determined amount of use.

At least a portion of the functionality of the various elements in FIG. 1, FIG. 2, FIG. 3, FIG. 4, and FIG. 10 can be performed by other elements in FIG. 1, FIG. 2, FIG. 3, FIG. 4, and FIG. 10 or an entity (e.g., processor 106, web service, server, application program, computing device, etc.) not shown in FIG. 1, FIG. 2, FIG. 3, FIG. 4, and FIG. 10.

In some examples, the operations illustrated in FIG. 5, FIG. 6, FIG. 7, FIG. 8, and FIG. 9 can be implemented as software instructions encoded on a computer-readable medium, in hardware programmed or designed to perform the operations, or both. For example, aspects of the disclosure can be implemented as a system on a chip or other circuitry including a plurality of interconnected, electrically conductive elements.

In other examples, a computer readable medium having instructions recorded thereon which when executed by a computer device cause the computer device to cooperate in performing a method of upgrading a card tier in real-time during a CNP transaction, the method comprising notifying a cardholder that an account associated with a card is eligible for upgrade to a higher tier, the account having a primary account number (PAN), wherein the PAN is associated with a first upgrade code corresponding to a first tier; subsequent to notifying the cardholder, receiving, by a recipient system, a card-not-present (CNP) request using the account associated with the card; upon receiving the CNP transaction request, requesting a consent from the cardholder for the upgrade to the higher tier, wherein the consent is requested within the recipient system before authorizing the CNP transaction; receiving the consent of the cardholder before authorizing the CNP transaction; upgrading the account of the cardholder to the higher tier by mapping a second upgrade code corresponding to a second tier with the PAN; and authorizing the transaction at the second tier using the second upgrade code mapped to the PAN, thus enabling a merchant-agnostic and industry-agnostic real-time card tier upgrade within the payment system.

While the aspects of the disclosure have been described in terms of various examples with their associated operations, a person skilled in the art would appreciate that a combination of operations from any number of different examples is also within scope of the aspects of the disclosure.

The term "Wi-Fi" as used herein refers, in some examples, to a wireless local area network using high frequency radio signals for the transmission of data. The term "BLUETOOTH®" as used herein refers, in some examples, to a wireless technology standard for exchanging data over short distances using short wavelength radio transmission. The term "NFC" as used herein refers, in some examples, to a short-range high frequency wireless communication technology for the exchange of data over short distances.

Exemplary Operating Environment

Exemplary computer-readable media include flash memory drives, digital versatile discs (DVDs), compact discs (CDs), floppy disks, and tape cassettes. By way of example and not limitation, computer-readable media comprise computer storage media and communication media. Computer storage media include volatile and nonvolatile, removable, and non-removable media implemented in any method or technology for storage of information such as computer-readable instructions, data structures, program modules and the like. Computer storage media are tangible and mutually exclusive to communication media. Computer storage media are implemented in hardware and exclude carrier waves and propagated signals. Computer storage media for purposes of this disclosure are not signals per se. Exemplary computer storage media include hard disks, flash drives, and other solid-state memory. In contrast, communication media typically embody computer-readable instructions, data structures, program modules, or the like, in a modulated data signal such as a carrier wave or other transport mechanism and include any information delivery media.

Although described in connection with an exemplary computing system environment, examples of the disclosure are capable of implementation with numerous other special purpose computing system environments, configurations, or devices.

Examples of well-known computing systems, environments, and/or configurations that can be suitable for use with aspects of the disclosure include, but are not limited to, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. Such systems or devices can accept input from the user in any way, including from input devices such as a keyboard or pointing device, via gesture input, proximity input (such as by hovering), and/or via voice input.

Examples of the disclosure can be described in the general context of computer-executable instructions, such as program modules, executed by one or more computers or other devices in software, firmware, hardware, or a combination thereof. The computer-executable instructions can be organized into one or more computer-executable components or modules. Generally, program modules include, but are not limited to, routines, programs, objects, components, and data structures that perform tasks or implement abstract data types. Aspects of the disclosure can be implemented with any number and organization of such components or modules. For example, aspects of the disclosure are not limited to the specific computer-executable instructions, or the specific components or modules illustrated in the figures and described herein. Other examples of the disclosure can include different computer-executable instructions or components having more functionality or less functionality than illustrated and described herein.

In examples involving a general-purpose computer, aspects of the disclosure transform the general-purpose computer into a special-purpose computing device when configured to execute the instructions described herein.

The examples illustrated and described herein as well as examples not specifically described herein but within the scope of aspects of the disclosure constitute exemplary means for upgrading an account within a payment system in real-time. For example, the elements illustrated in FIG. 1, FIG. 2, FIG. 3, FIG. 4, and FIG. 10, such as when encoded to perform the operations illustrated in FIG. 5, FIG. 6, FIG. 7, FIG. 8, and FIG. 9 constitute exemplary means for notifying a cardholder that an account associated with a card is eligible for upgrade to a higher tier, the account having a PAN, wherein the PAN is associated with a first tier; exemplary means for receiving a CNP request using the account associated with the card; exemplary means for requesting a consent from the cardholder for the upgrade to the higher tier, wherein the consent is requested within the recipient system before authorizing the CNP transaction; exemplary means for receiving the consent of the cardholder before authorizing the CNP transaction; exemplary means for upgrading the account of the cardholder to the higher tier by associating an upgrade code corresponding to a second tier with the PAN; and exemplary means for authorizing the transaction at the second tier using the upgrade code associated with the PAN, thus enabling a merchant-agnostic and industry-agnostic real-time card tier upgrade within the payment system.

Other non-limiting examples provide one or more computer storage devices having a first computer-executable instructions stored thereon for providing real-time upgrading of a card account tier. When executed by a computer, the computer performs operations including notifying a cardholder that an account associated with a card is eligible for upgrade to a higher tier, the account having a primary account number (PAN), wherein the PAN is associated with a first tier; subsequent to notifying the cardholder, receiving, by a recipient system, a card-not-present (CNP) request using the account associated with the card; upon receiving the CNP transaction request, requesting a consent from the cardholder for the upgrade to the higher tier, wherein consent is requested within the recipient system before authorizing the CNP transaction; receiving the consent of the cardholder before authorizing the CNP transaction; upgrading the account of the cardholder to the higher tier; mapping an upgrade code corresponding to a second tier to the PAN within an upgrade code mapping table; and authorizing the transaction at the second tier using the second upgrade code mapped to the PAN.

The order of execution or performance of the operations in examples of the disclosure illustrated and described herein is not essential, unless otherwise specified. That is, the operations can be performed in any order, unless otherwise specified, and examples of the disclosure can include additional or fewer operations than those disclosed herein. For example, it is contemplated that executing or performing an operation before, contemporaneously with, or after another operation is within the scope of aspects of the disclosure.

The indefinite articles "a" and "an," as used in the specification and in the claims, unless clearly indicated to the contrary, should be understood to mean "at least one." The phrase "and/or," as used in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to "A" only (optionally including elements other than "B"); in another embodiment, to B only (optionally including elements other than "A"); in yet another embodiment, to both "A" and "B" (optionally including other elements); etc.

As used in the specification and in the claims, "or" should be understood to have the same meaning as "and/or" as defined above. For example, when separating items in a list, "or" or "and/or" shall be interpreted as being inclusive, i.e., the inclusion of at least one, but also including more than one of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used shall only be interpreted as indicating exclusive alternatives (i.e., "one or the other but not both") when preceded by terms of exclusivity, such as "either" "one of" only one of or "exactly one of." "Consisting essentially of," when used in the claims, shall have its ordinary meaning as used in the field of patent law.

As used in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of 'A' and 'B'" (or, equivalently, "at least one of 'A' or 'B'," or, equivalently "at least one of 'A' and/or 'B'") can refer, in one embodiment, to at least one, optionally including more than one, "A", with no "B" present (and optionally including elements other than "B"); in another embodiment, to at least one, optionally including more than one, "B", with no "A" present (and optionally including elements other than "A"); in yet another embodiment, to at least one, optionally including more than one, "A", and at least one, optionally including more than one, "B" (and optionally including other elements); etc.

The use of "including," "comprising," "having," "containing," "involving," and variations thereof, is meant to encompass the items listed thereafter and additional items.

Use of ordinal terms such as "first," "second," "third," etc., in the claims to modify a claim element does not by itself connote any priority, precedence, or order of one claim element over another or the temporal order in which acts of a method are performed. Ordinal terms are used merely as labels to distinguish one claim element having a certain name from another element having a same name (but for use of the ordinal term), to distinguish the claim elements.

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system for real-time card tier upgrade of an account during a card-not-present transaction, the system comprising:

a processor; and a computer-readable medium storing instructions that are operative upon execution by the processor to:

notify a cardholder that an account associated with a card is eligible for upgrade to a higher tier, the account having a primary account number (PAN), wherein the PAN is associated with a first tier;

subsequent to notifying the cardholder, receive, by a recipient system, a card-not-present (CNP) transaction request associated with a CNP transaction using the account associated with the card;

upon receiving the CNP transaction request, request a consent from the cardholder for the upgrade to the higher tier, wherein the consent is requested within the recipient system before authorizing the CNP transaction;

receive the consent of the cardholder before authorizing the CNP transaction;

upgrade the account of the cardholder to the higher tier by associating an upgrade code corresponding to a second tier with the PAN; and authorize the CNP transaction at the second tier using the upgrade code associated with the PAN, causing a merchant-agnostic and industry-agnostic real-time card tier upgrade within the recipient system;

generate a plurality of icons associated with a plurality of accounts, each account in the plurality of accounts associated with a tier in a plurality of tiers;

receive, via a graphical user interface (GUI), a user selection to organize each icon in the plurality of icons based on a specific criterion, wherein the specific criterion is an amount of use of each icon;

determine the amount of use of each icon using a processor that tracks an amount of memory allocated to each application associated with each icon over a period of time; and automatically move most-used icons to a position on the GUI closest to a start icon of a computer system based on the determined amount of use.

2. The system of claim 1, wherein the card is a payment card, and wherein the instructions are further operative to:

capture, by a recipient network, a transaction reference identifier (ID) of the CNP transaction, the transaction reference ID being common across the cardholder, an issuer of the payment card, and a payment network; and create a record of account tier upgrades associated with the account and consent obtained from the cardholder within a transaction record table, wherein the record of the account tier upgrades and upgrade consents are associated with the transaction reference ID.

3. The system of claim 2, wherein the instructions are further operative to:

receive, by the recipient network, an audit request associated with the CNP transaction from a requestor;

retrieve consent data associated with the consent obtained from the cardholder from the transaction record table using the transaction reference ID; and present the consent data to the requestor via a user interface device.

4. The system of claim 2, wherein the instructions are further operative to:

receive, by the recipient network, an audit request associated with the CNP transaction from a requestor, wherein the audit request comprises a request for information associated with previous upgrades associated with the account of the cardholder;

retrieve the record of the account tier upgrades associated with the account from the transaction record table using the transaction reference ID; and present upgrade data obtained from the record of the account tier upgrades to the requestor via a user interface device.

5. The system of claim 1, wherein the instructions are further operative to:

map the PAN to the upgrade code in an upgrade code mapping stored on a data storage device.

6. The system of claim 1, wherein the instructions are further operative to:

receive a second CNP transaction request using the account associated with the card;

determine whether the cardholder is eligible for a second upgrade to a next higher tier;

responsive to determining the cardholder is eligible, request a second consent from the cardholder for the upgrade to the next higher tier, wherein the second consent is requested within the recipient system before authorizing the second CNP transaction;

responsive to receiving the second consent of the cardholder, upgrade the account of the cardholder to the next higher tier by mapping a second upgrade code corresponding to the next higher tier with the PAN; and authorize the second CNP transaction at the next higher tier using the second upgrade code associated with the PAN in real-time during authorization of the second CNP transaction.

7. The system of claim 1, wherein the instructions are further operative to:

rank the icons of the plurality of icons, by the processor, based on the determined amount of use.

8. The system of claim 1, wherein the instructions are further operative to:

map the PAN to a second upgrade code in an upgrade code mapping stored on a data storage device.

9. One or more computer storage devices having computer-executable instructions stored thereon, which, upon execution by a computer, cause the computer to perform operations comprising:

notifying a cardholder that an account associated with a card is eligible for upgrade to a higher tier, the account having a primary account number (PAN), wherein the PAN is associated with a first tier;

subsequent to notifying the cardholder, receiving, by a recipient system, a request associated with a card-not-present (CNP) transaction using the account associated with the card;

upon receiving the request associated with the CNP transaction, requesting a consent from the cardholder for the upgrade to the higher tier, wherein the consent is requested within the recipient system before authorizing the CNP transaction;

receiving the consent of the cardholder before authorizing the CNP transaction;

upgrading the account of the cardholder to the higher tier;

mapping an upgrade code corresponding to a second tier to the PAN within an upgrade code mapping table;

authorizing the CNP transaction at the second tier using the upgrade code mapped to the PAN, causing a merchant-agnostic and industry-agnostic real-time card tier upgrade within the recipient system;

generating a plurality of icons associated with a plurality of accounts, each account in the plurality of accounts associated with a tier in a plurality of tiers;

receiving, via a graphical user interface (GUI), a user selection to organize each icon in the plurality of icons based on a specific criterion, wherein the specific criterion is an amount of use of each icon;

determining the amount of use of each icon using a processor that tracks an amount of memory allocated to each application associated with each icon over a period of time; and automatically moving most-used icons to a position on the GUI closest to a start icon of a computer system based on the determined amount of use.

10. The one or more computer storage devices of claim 9, wherein the card is a payment card, and wherein the operations further comprise:

capturing, by a recipient network, a transaction reference ID of the CNP transaction, the transaction reference ID being common across the cardholder, an issuer of the payment card, and a payment network; and creating a record of account tier upgrades associated with the account and upgrade consents obtained from the cardholder within a transaction record table, wherein the record of the account tier upgrades and upgrade consents are associated with the transaction reference ID.

11. The one or more computer storage devices of claim 10, wherein the operations further comprise:

receiving, by the recipient network, an audit request associated with the CNP transaction from a requestor user device, wherein the audit request comprises a request for information associated with the consent provided by the cardholder;

retrieving consent data associated with the consent obtained from the cardholder from the transaction record table using the transaction reference ID; and providing the consent data to the requestor user device via a network.

12. The one or more computer storage devices of claim 10, wherein the operations further comprise:

receiving, by the recipient network, an audit request associated with the CNP transaction from a requestor user device, wherein the audit request comprises a request for information associated with previous upgrades associated with the account of the cardholder;

retrieving the record of the account tier upgrades associated with the account from the transaction record table using the transaction reference ID; and providing upgrade data obtained from the record of the account tier upgrades to the requestor user device via a network.

13. The one or more computer storage devices of claim 9, wherein the operations further comprise:

responsive to a failure to receive the consent for upgrade to the second tier from the cardholder, authorizing the CNP transaction at the first tier.

14. The one or more computer storage devices of claim 9, wherein the operations further comprise: ranking the icons of the plurality of icons, by the processor, based on the determined amount of use.

15. A computerized method for performing a real-time card tier upgrade of an account during a card-not-present transaction, the computerized method comprising:

notifying a cardholder that an account associated with a card is eligible for upgrade to a higher tier, the account having a primary account number (PAN), wherein the PAN is associated with a first upgrade code corresponding to a first tier;

subsequent to notifying the cardholder, receiving, by a recipient system, a card-not-present (CNP) transaction request associated with a CNP transaction using the account associated with the card;

upon receiving the CNP transaction request, requesting a consent from the cardholder for the upgrade to the higher tier, wherein the consent is requested within the recipient system before authorizing the CNP transaction;

receiving the consent of the cardholder before authorizing the CNP transaction;

upgrading the account of the cardholder to the higher tier by mapping a second upgrade code corresponding to a second tier with the PAN;

authorizing the CNP transaction at the second tier using the second upgrade code mapped to the PAN, causing a merchant-agnostic and industry-agnostic real-time card tier upgrade within the recipient system;

generating a plurality of icons associated with a plurality of accounts, each account in the plurality of accounts associated with a tier in a plurality of tiers;

receiving, via a graphical user interface (GUI), a user selection to organize each icon in the plurality of icons based on a specific criterion, wherein the specific criterion is an amount of use of each icon;

determining the amount of use of each icon using a processor that tracks an amount of memory allocated to each application associated with each icon over a period of time; and automatically moving most-used icons to a position on the GUI closest to a start icon of a computer system based on the determined amount of use.

16. The method of claim 15, wherein the card is a payment card, and further comprising:

capturing, by a recipient network, a transaction reference ID of the CNP transaction, the transaction reference ID being common across the cardholder, an issuer of the payment card, and a payment network; and creating a record of account tier upgrades associated with the account and upgrade consents obtained from the cardholder within a transaction record table, wherein the record of account tier upgrades and upgrade consents are associated with the transaction reference ID.

17. The method of claim 16, further comprising:

receiving, by the recipient network, an audit request associated with the CNP transaction from a requestor user device;

retrieving consent data associated with the consent obtained from the cardholder from the transaction record table using the transaction reference ID; and providing the consent data to the requestor user device via a network.

18. The method of claim 16, further comprising:

receiving, by the recipient network, an audit request associated with the CNP transaction from a requestor user device, wherein the audit request comprises a request for information associated with previous upgrades associated with the account of the cardholder;

retrieving the record of the account tier upgrades associated with the account from the transaction record table using the transaction reference ID; and providing upgrade data obtained from the record of the account tier upgrades to the requestor user device via a network.

19. The method of claim 15, further comprising:

mapping the PAN to the second upgrade code in an upgrade code mapping stored on a data storage device.

20. The method of claim 15, further comprising:

generating an upgrade notification informing the cardholder of successful upgrade of the account from the first tier to the second tier; and presenting the upgrade notification to the cardholder via a user interface device.

* * * * *